March 20, 1934.  E. E. CORBETT  1,951,396
CONTROL MECHANISM
Filed July 18, 1932   2 Sheets-Sheet 2
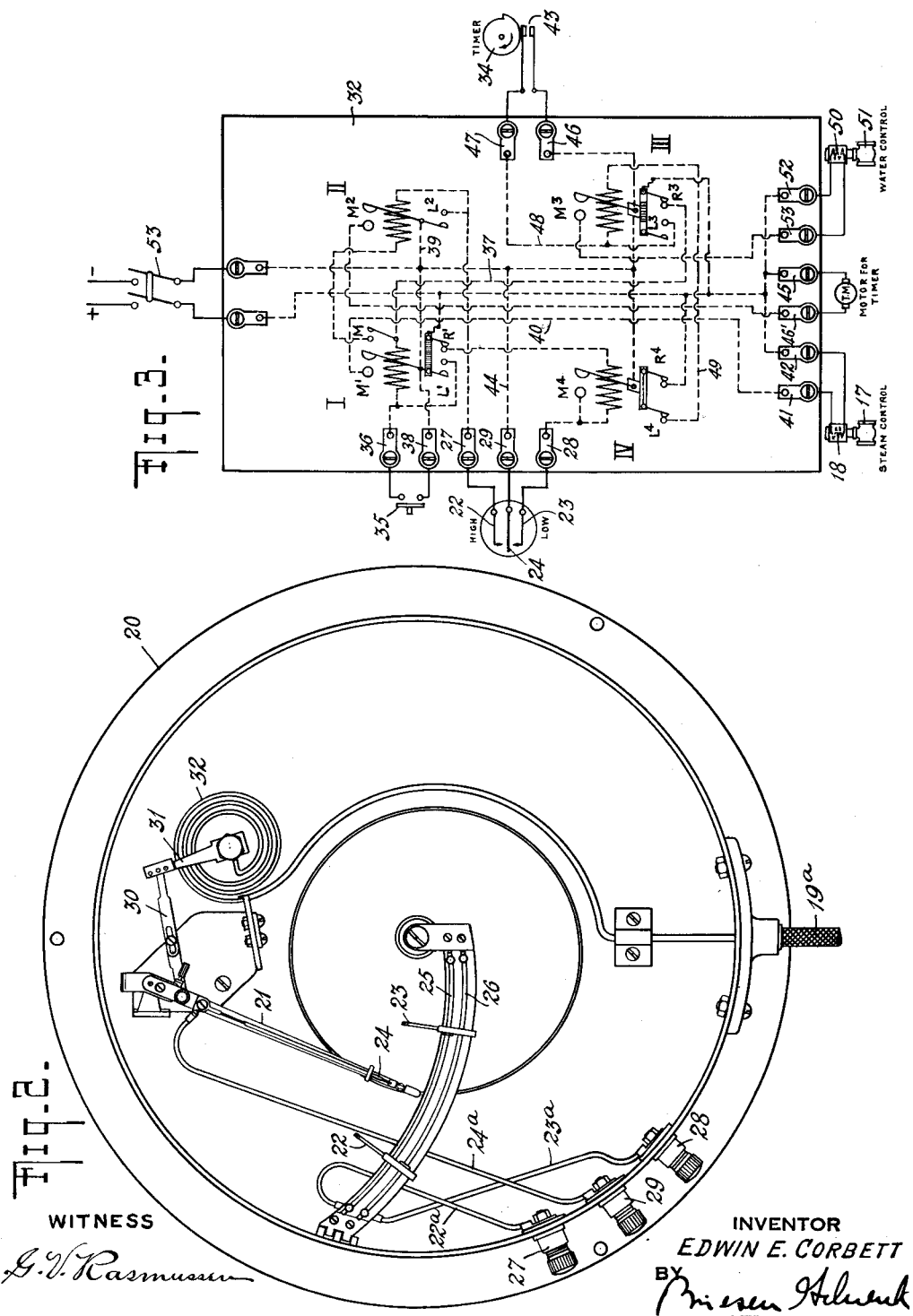
WITNESS
G. V. Rasmussen
INVENTOR
EDWIN E. CORBETT
BY
ATTORNEYS Patented Mar. 20, 1934

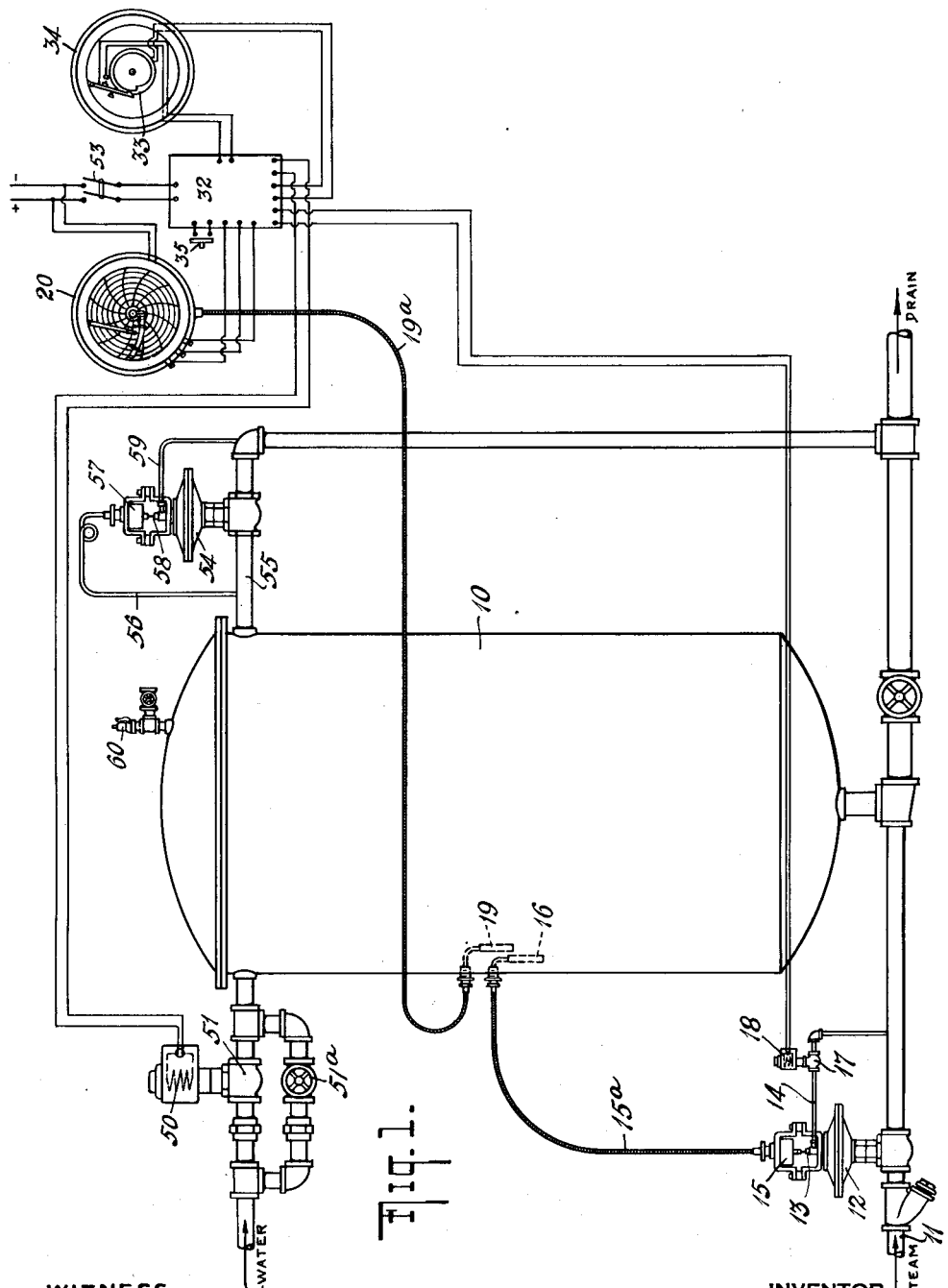

1,951,396

UNITED STATES PATENT OFFICE 1,951,396

CONTROL MECHANISM

Edwin E. Corbett, Ramsey, N. J., assignor to Charles J. Tagliabue Mfg. Co., Brooklyn, N. Y., a corporation of New York Application July 18, 1932, Serial No. 623,094

18 Claims. (Cl. 236—46)

The present invention relates to automatic control mechanism for determining and controlling a series or sequence of operations and for timing the duration of at least one of such operations; and relates in particular to a mechanism of this kind which is operated without the aid of compressed air or other pressure fluid.

It is an object of the present invention to provide automatic control mechanism, for use with an apparatus to which a treating fluid of a temperature or pressure above or below atmospheric is fed, whereby a predetermined temperature or pressure is caused to be reached in said apparatus and maintained for a predetermined length of time. More specifically, it is the object of the invention to provide automatic mechanism operated electrically for controlling and timing a group of valves or equivalent devices to secure a desired sequence of operations, the time of the operation or operations wherein time is a critical factor being controlled with a high degree of accuracy and without danger of overlapping with the other portions of the operating cycle, such as the preliminary heating or cooling period during which material under treatment is brought to the critical temperature, or the subsequent cooling or heating period during which the material is returned to atmospheric temperature. It is also an object of the invention to provide an automatic control mechanism of the type indicated which is simple in construction and reliable in operation. It is a further object of the invention to provide a system of electrical relays whereby the time during which the material is maintained at a critical temperature is accurately controlled. A still further object of the invention is to provide a control arrangement wherein temporary failure of the current supply is without effect upon the duration of the treatment at the critical temperature (or pressure), and wherein after the supply of current is restored, the cycle of operations can be resumed in a simple manner. Other objects of the invention will appear from the following description and the features of novelty will be set forth in the appended claims.

The present invention is of particular utility in connection with the treatment of various kinds of materials wherein the temperature of the material is changed from the normal or room temperature to another temperature during a preliminary period, and is then maintained for a definite period of time, called the holding period, at such other temperature, after which it is restored to the normal or room temperature, or to approximately such temperature. While, therefore, my invention is in general applicable to treatments of various kinds in which the material is first heated to a temperature above room temperature and then maintained at a predetermined elevated temperature for a definite period of time, and then cooled to room temperature; and likewise to treatments wherein the material is first cooled to a predetermined temperature below atmospheric and maintained at the low temperature for a predetermined interval of time, after which it is reheated to restore it to atmospheric temperature, the invention will be described hereinbelow in connection with apparatus of the first type, that is, wherein the material is heated to a definite temperature, then held at such temperature for a predetermined interval of time, and finally cooled down to room temperature.

In certain canning processes, as well as in many chemical processes, the desired treatment or chemical reaction is carried out by heating (or cooling) the material to a predetermined temperature during a preliminary period, holding the material at this temperature for a definite time interval, and then restoring the same to approximately atmospheric temperature by cooling or heating. The heating and cooling periods before and after the holding or reaction period are generally of secondary importance in comparison with the timing of the critical holding period at the treating or reaction temperature; they may therefore vary within reasonably wide limits without detrimental effect on the properties of the product. The treatment or reaction at the critical conditions of temperature and time may take place at normal or atmospheric pressure, or under reduced pressure, or at elevated pressure regulated by a suitable pressure control device.

The invention will be described in detail in connection with the control of a retort or cooker for heating canned goods, but it is to be understood that such apparatus is referred to by way of example only and that the invention is not limited thereto.

In the drawings,

Fig. 1 is a diagrammatic view in elevation of a retort provided with a control mechanism in accordance with the invention;

Fig. 2 is an enlarged view of the time-temperature recorder illustrating certain details of the control mechanism and Fig. 3 is a view of the relay panel showing the several relays and their connections.

The numeral 10 indicates a retort or cooker in which a number of cans or jars are to be heated to a definite temperature, then maintained at such temperature for a predetermined interval of time, and subsequently cooled to approximately room temperature, after which they are removed from the retort. The retort is supplied with steam or other heating agent through a pipe 11, such steam flowing in direct contact with the cans or jars. Where the retort is in the form of a kettle having a mass of material therein, such steam may flow through coils or jackets in any known manner.

The flow of steam to conduit 11 is controlled by a diaphragm valve 12 of known type, the same comprising generally a valve fixed to a diaphragm to both sides of which steam from conduit 11 has access, the space above the diaphragm, however, being connected through a pilot valve 13 with a by-pass 14 which may lead into the atmosphere or, as illustrated, is connected with the conduit 11 at the low pressure side of the valve. When steam is permitted to flow through the pilot valve 13 into by-pass 14, the pressure below the diaphragm is greater than that above the same so that the control valve is lifted from its seat. When, however, the pilot valve is closed and thereby shuts off the by-pass 14, steam accumulates upon the upper side of the diaphragm until it becomes equal in pressure to the steam below the diaphragm, whereupon the latter assumes a position in which the control valve is closed.

The pilot valve 13 is controlled directly by an expansible member 15 connected with a thermostatic bulb 16 positioned at a suitable place within the retort. By suitably adjusting the expansible member 15, the maximum temperature in the retort may be controlled. During the normal operation of the device, the member 15 holds the pilot valve in such a position that the control valve 12 is throttled to the degree necessary to feed only so much steam to the retort as is required to maintain the predetermined temperature. The structure and operation of the valve 12 are known and therefore need not be described in greater detail.

The by-pass 14 is controlled also by a valve 17 operated by a solenoid 18, as will be described hereinbelow. It may be mentioned at this point, however, that the closing of the control valve 12 may be effected by the closing of the by-pass 14 by the valve 17 irrespective of the condition of the pilot valve 13.

A second thermostatic bulb 19 is positioned within the retort and is connected to an electric contact thermometer 20 (see Fig. 2) which may be of the recording type as shown. With the index pointer or pen 21 of the thermometer are associated high and low contacts 22 and 23, a common contact 24 being positioned upon the pen but insulated therefrom. The contacts 22 and 23 are located upon a pair of conducting rails 25 and 26, each of the contacts being electrically connected with one of the rails but insulated from the other. Thus the contact 22 is electrically connected with the rail 25, and with a terminal 27 by means of a conductor 22a; while the contact 23 is connected with the rail 26, and with a terminal 28 by the conductor 23a. The common contact 24 is connected by a suitable flexible conductor 24a with a terminal 29. The index pointer or pen 21 is joined in known manner by an adjustable link 30 with an arm 31 fixed to the inner movable end of a Bourdon pressure coil 32 connected with the thermostatic bulb 19 by a capillary tube 19a.

It will be understood that as the temperature in the retort rises and falls, the index pointer 21 will oscillate between the high and low contacts 22 and 23. In accordance with the present invention, mechanism is provided whereby, after the feed of a heating fluid into the retort has started and as soon as the common contact 24 engages the high contact 22, a timing mechanism is put into operation, and after the lapse of a predetermined interval of time, for which the timer may be manually set, the supply of heating fluid to the retort is stopped and the admission of a cooling agent thereinto effected. I accomplish such determination and timing of the holding period of the retort by means of a number of electrical relays in association with an electrically operated block, the parts being so constructed and arranged that even in the event of a mishap there is no danger of the holding period being permitted to exceed the predetermined time interval, as will be described below.

The relay mechanism I, II, III, IV on the panel 32 shown in Fig. 4 controls the starting of the entire process, the length of time for which the apparatus is held at the desired temperature, and the opening and closing of the conduit which introduces the cooling agent into the retort. A timing cam 33 (Fig. 1) and a clock mechanism 34 are associated with and controlled by such relay mechanism. At the beginning of a cycle, relays I, II and III are open, while relay IV is closed through the making of low contact 23 and common contact 24 of the contact thermometer at the end of the preceding cycle. The operation of the apparatus is initiated by momentary depression of a push button switch 35, whereupon the normally open relay I is energized and closed. Depression of the button 35 closes the following circuit through the relay I: from terminal 36 through the relay I coil, conductor 37, normally closed contact R3 of relay III, to the positive line, and through terminal 38 directly to the negative line through conductor 39. Upon closing of the relay I, the following circuit is closed for energizing the solenoid 18 of the valve 17: from the negative line through the conductor 39 to the armature of the relay, through load contact M1, conductor 40, terminal 41, solenoid 18, terminal 42, to the positive line. The by-pass 14 is thereupon opened and the valve 12 placed under the control of the thermostatic bulb 16. As the temperature in the retort is below that for which the member 15 is set, the pilot valve 13 is open and steam is fed by conduit 11 into the retort and the temperature of the latter thus raised. The relay I is also provided with a contact M in series with the coil of relay II, so that relay II can be energized only when relay I is closed.

Upon the closing of the relay I, a back holding contact L1 is likewise closed, the same forming part of a holding circuit composed of the following: the conductor 39 running from the negative line, contact L1, armature coil, conductor 37, contact R3 of relay III, to the positive line. The relay I is also provided with a normally closed contact R1 which is opened upon energization of the relay I and thereby opens the normally closed relay IV, as set forth hereinbelow. The opening of contact R1 thus serves to trip relay IV at the start of the cycle to open the same, whereupon relay IV closes back contacts L4 and R4 which are in series with each other and with the coil of relay III and prepares the circuit for the latter, so that it is able to close when the necessary impulse is furnished through the contacts 43 controlled by the timer 34, as described below. If the relay I is tripped for any reason, it can be re-energized only by contact through the push button switch 35.

As the feed of heating fluid into the retort continues, the temperature therein rises to the point predetermined by the setting of the expansible member 15, whereupon the common contact 24 (Fig. 2) engages the high contact 22. When this occurs, the relay II is closed through the following circuit: negative line, conductor 44, terminal 29, common contact 24, high contact 22, terminal 27, coil of relay II, contact M of relay I (the latter being closed), conductor 37, contact R3 of relay III to the positive line. The load contact M2 of relay II thereupon closes a circuit to the motor M of the timer 34, such circuit including the positive line, terminal 45, motor TM, terminal 46', contact M2, and the relay armature to the negative line. The relay II is provided with a contact L2 which holds the relay closed regardless of "fluttering" of the high contact caused by slight rise and fall of the temperature in the retort, such holding circuit running from the negative line through contact L2, relay coil, contact M, conductor 37, and contact R3 to the positive line. The relay II is maintained closed through the contact L2, until it is tripped by opening of the normally closed contact R3 of relay III, or by failure of current. To reclose relay II, after an interruption in the supply of current from the power lines, it is necessary to push the starter button 35 to energize relay I, and if the high and common contacts 22, 24 are in engagement at such instant the relay II will be closed and the timer 34 will be re-started: otherwise the feed of steam into the retort continues until the high contact 22 is made.

Relay II is tripped and the motor M of the timer thereby stopped upon closing of the contact 43 by the timer after the lapse of a predetermined interval of time after the starting of the motor of such timer. Upon closing of such contact, a circuit is established from the negative line through terminal 46, contact 43, terminal 47, conductor 48, coil of relay III, conductor 49, contacts L4 and R4 in series with said coil, to the positive line. The relay III is thereupon closed and closes the contact M3, whereupon the solenoid 50 of the water controlled valve 51 is energized, the circuit being established as follows: positive line, terminal 52, solenoid 50, terminal 53, contact M3, armature of relay III, to the negative line. The relay III is maintained closed, even after the contact 43 is opened, by a holding circuit through back contact L3. Upon closing of relay III, the contact R3 is opened, and thereby the circuit through the coil of relay I is opened. This results in opening of relay I and likewise of relay II since the contact M in series with the coil of relay II is also opened.

During the time interval controlled by the timer 34, the valve 12 was maintained in throttling condition by the member 15 so as to feed only so much steam to the retort as was necessary to maintain the temperature in such retort at the predetermined value. Upon de-energization of relay I by the opening of contact R3, the valve 17 is permitted to close, whereupon the feed of steam through valve 12 ceases substantially simultaneously with the opening of the water valve 51.

The back contact L3 holds relay III closed until the circuit is opened at the series contacts L4 and R4 of relay IV. If relay III is tripped for any reason, except upon energization of relay IV by engagement of low contact 23 with the common contact 24, as described below, the relay III will always reclose as long as the timer contact 43 is closed and thus will always re-open water valve 51. A by-pass water valve 51a may be provided to admit water into the retort independently of the control mechanism.

As cooling water enters the retort, the temperature therein falls until the common contact 24 engages the low contact 23. Thereupon the relay IV, which at the beginning of the cycle was closed but was tripped by opening of contact R1 when relay I was closed, is energized and again closed through the following circuit: negative line, conductor 44, terminal 29, common contact 24, low contact 23, terminal 28, coil of relay IV, contact R1 of relay I to the positive line. The closing of relay IV opens contacts L4 and R4 and thereby de-energizes relay III and causes opening of the latter. The solenoid 48 is thereupon de-energized and the water valve is closed under the action of its spring or other means. The relay IV is maintained closed through its contact M4 so that even though the common contact 24 should become disengaged from the low contact 23 due to a slight rise in the temperature in the retort, the relay will remain energized. This relay remains closed at the end of the cycle after the low contact has been made in the contact thermometer, and remains closed as long as the relay panel is energized, i. e. as long as the main switch 53 is closed. The relay IV is again opened as soon as the push button 35 is depressed at the beginning of a new cycle, at which instant the contact R1 in series with the coil of the relay is opened, as described hereinabove.

If the main line switch 53 is opened to stop the cycle or a fuse blows, or if the supply of current fails for other reasons, and if the high contact 22 has not yet been engaged by the common contact 24, the control operations may be resumed by depression of the starting button 35, the relay I being thereby closed while the relay II remains open. If the high contact 22 has already been engaged (relay I being then closed and likewise relay II), the control operations may again be resumed by depressing the button 35. If the shut-down has been of sufficient duration to permit the temperature of the retort to fall below the holding temperature, resumption of the process cycle through restoration of electrical service to the relay panel and depression of button 35 will close relay I to admit steam to the retort to raise the temperature again to the holding temperature, when relay II will again close and permit the timer to operate for the remainder of the pre-set holding period. If desired, the timer can in such case be re-set to make any necessary compensation in the holding period for the time lost during the shut-down.

If the supply of current to the relay panel is interrupted after the holding period has terminated and the timer contact 43 has closed, the relay III being then closed and relay I and relay II being open, the renewed supply of current will automatically close relay III and open the cooling water valve 51, and water will continue to flow into the retort until the low contact is made in the contact thermometer.

The pressure within the retort may be controlled by means of an automatic diaphragm valve 54 (Fig. 1) in the exhaust or drain pipe 55 which is of the general type to which steam valve 12 belongs but has the following differences over the latter: The conduit 56, which corresponds to conduit 15a, and leads to the expansible member 57, is connected to the drain pipe 54, at the high pressure side of the valve. Rise of pressure in the member 57 beyond a predetermined maximum causes opening of the pilot valve 58 connected with the discharge line 59, whereupon the fluid pressure upon the lower side of the diaphragm of the valve 54 tends to exceed the pressure on the upper side, and the valve moves into open position to relieve the pressure in the retort. Upon fall of pressure in the retort, the valve 54 closes or is throttled to permit pressure to build up in the retort. In place of the valve 54 any other suitable pressure relief valve may be employed.

A safety valve 60 (Fig. 1) of any known construction may be provided to prevent dangerous rise of pressure in the retort should the valve 54 fail to operate or prove inadequate for any reason.

It will be understood that, while I have described my improved control apparatus in connection with the controlling and timing of a treatment at a desired temperature, the same may be utilized also to control and time a treatment under pressure merely by connecting the Bourdon coil 32 with the interior of the retort or by replacing such coil with any other suitable pressure-responsive device. Where, therefore, I refer in the claims to a temperature-responsive mechanism, I mean to include thereby a pressure-responsive mechanism as an equivalent.

It will be evident that certain features of my invention may be used without others, and that variations may be resorted to within the scope of the appended claims without departing from the spirit of the invention. For example, if it should be desired to remove the contents of the retort without first restoring the same to atmospheric conditions, the cooling water valve may be omitted, or no control therefor need be provided.

I claim:

1. Apparatus for automatically controlling a sequence of operations including a preliminary period, a holding period at a temperature different from atmospheric temperature, and a restoring period, comprising means for starting the cycle of operations and initiating the preliminary period by starting the flow of a treating fluid into a vessel under control, temperature responsive mechanism associated with said vessel, an electrical contact associated with said temperature responsive mechanism and adapted to be closed when the temperature for the holding period is reached, timing mechanism controlled by an electrical circuit of which such contact is a part and adapted to be set into operation when such contact is closed, electrical mechanism controlled by said timer and operative upon the lapse of a predetermined time interval to stop the flow of treating fluid to said vessel, and means operative substantially simultaneously with the cessation of flow of the treating fluid to introduce a fluid of different temperature into the vessel to restore the temperature therein to approximately atmospheric.

2. Apparatus for automatically controlling the feed of two fluids of different temperature into a treating vessel through two electrically controlled valves, comprising a starting mechanism operable to initiate the feed of fluid of higher temperature into said vessel through one of said valves, a timing device, thermostatic mechanism operative when a predetermined temperature has been reached in said vessel to set said timing device into operation, thermostatic mechanism associated with said valve to regulate the flow of fluid at a rate to maintain a predetermined temperature in said vessel, electrical mechanism controlled by said timing device to effect closing of said valve at the end of a predetermined time interval and opening of the other valve, and means controlled by said first-mentioned thermostatic mechanism to close said second valve when the temperature has fallen to a predetermined value.

3. Apparatus as set forth in claim 2, wherein the valve controlling the fluid of higher temperature comprises a diaphragm valve, both sides of whose diaphragm are subjected to the pressure of said fluid, a pilot valve controlling the discharge of fluid from one side of the diaphragm, and a conduit leading from said pilot valve, the electrical mechanism controlled by the timing device including a solenoid-operated valve arranged in said conduit and operative upon closing thereof to cause said first-mentioned valve to close.

4. Apparatus as set forth in claim 2, wherein said first-mentioned thermostatic mechanism comprises a contact thermometer having high and low contacts and a common contact, said high contact controlling said timing device and said low contact controlling said second valve.

5. Apparatus for automatically controlling the feed of two fluids of different temperature into a treating vessel, comprising two electrically controlled valves, a first relay controlling the valve feeding the fluid of higher temperature, a manually operated switch for energizing said relay, a thermostatic contact device associated with said vessel and including a high temperature contact and a low temperature contact, a second relay having an energizing circuit including said high temperature contact, a timing mechanism controlled by said second relay, a third relay, an electrical contact adapted to be closed by said timing device at the end of a predetermined interval of time to energize said third relay, an electrical circuit controlling the second valve and adapted to be closed upon energization of the third relay to open such second valve, means operative substantially simultaneously with the energization of said third relay to open said first relay, a fourth relay having an energizing circuit including said low temperature contact and operative when the temperature in said vessel has fallen to a predetermined value to open the control circuit of said second valve and cause the latter to close.

6. Apparatus as set forth in claim 5, wherein said first relay includes a normally open contact in series with the coil of the second relay, whereby the latter relay can be energized only while the first relay is closed.

7. Apparatus as set forth in claim 5 wherein said third relay includes a normally closed contact in series with the coil of the first relay, whereby upon closing of said third relay and opening of said contact, the first relay is deenergized.

8. Apparatus as set forth in claim 5, wherein said first relay includes a normally closed contact in series with the coil of the fourth relay, whereby the latter is deenergized upon closing of the first relay.

9. Apparatus as set forth in claim 5, wherein said fourth relay includes a normally closed contact in series with the coil of the third relay, whereby upon closing of said fourth relay and opening of said contact, the circuit of the third relay is broken.

10. Apparatus as set forth in claim 5, including a normally open contact in series with the coil of the second relay and a normally closed contact in series with the coil of the fourth relay, both controlled by the first relay, a normally closed contact in series with the coil of the first relay and controlled by the third relay, and a normally closed contact in series with the third relay and controlled by said fourth relay.

11. Apparatus as set forth in claim 5, including a holding circuit for the second relay to keep said relay closed after energization in spite of fluttering at the high contact.

12. Apparatus as set forth in claim 5, including a holding circuit for the fourth relay to keep said relay closed after energization in spite of fluttering at the low contact.

13. Apparatus for automatically controlling the feed of a heating fluid into a vessel to maintain the temperature therein at a definite value for a predetermined interval of time, comprising a feed conduit leading into said vessel, a valve in said conduit, thermostatic mechanism associated with said valve and responsive to fluctuations in the temperature in said vessel to regulate the valve continuously to establish and maintain a predetermined temperature in said vessel throughout said predetermined interval of time, a timing device, thermostatic mechanism associated with said device, an electrical circuit controlled by said thermostatic mechanism and adapted to set said timing device into operation when said predetermined temperature is reached in said vessel, and an electrical circuit adapted to be closed by said timing device after the lapse of said predetermined interval of time to effect closing of said valve and thereby rendering said valve no longer responsive to the temperature conditions in said vessel.

14. Apparatus for automatically controlling the feed of a heating fluid into a vessel to maintain the temperature therein at a definite value for a predetermined interval of time, comprising a feed conduit leading into said vessel, a valve in said conduit, a timing device, an electrical circuit therefor, means responsive to fluctuations in the temperature in said vessel and associated with said valve to regulate the same continuously to establish and maintain a predetermined temperature in said vessel throughout said predetermined interval of time, mechanism controlled by said temperature responsive means to close said circuit when the predetermined temperature is reached to put said timing device into operation, and an electrical circuit adapted to be controlled by said timing device after the lapse of said predetermined interval of time to effect closing of said valve and thereby rendering said valve no longer responsive to the temperature conditions in said vessel.

15. Apparatus for automatically controlling a sequence of operations, comprising a conduit leading to a vessel to be controlled, a valve in said conduit, means for effecting opening of said valve to initiate the feed of a fluid into said vessel, means responsive to fluctuations in the temperature in said vessel and associated with said valve to regulate the same to establish and maintain a predetermined temperature in said vessel, a timing mechanism, an electric motor therefor, a circuit for said motor having normally open contacts, means operable when the predetermined temperature is reached to close said contacts and start said timing mechanism, an electrical circuit controlling said valve, and contacts in said circuit arranged to be closed by said timing mechanism at the end of a predetermined time interval to effect closing of the valve and thereby rendering said valve no longer responsive to the temperature conditions in said vessel.

16. Apparatus for automatically establishing a predetermined temperature in a vessel under control and maintaining such temperature for a predetermined interval of time, comprising a conduit for introducing a treating fluid under pressure into said vessel, a valve of the type which is actuated by the pressure of the fluid passing therethrough for controlling said conduit, means responsive to fluctuations in the temperature in said vessel for continuously regulating said valve to establish and maintain a predetermined temperature in said vessel, a timing mechanism having an electrical circuit for operating the same, means controlled by said temperature responsive means for closing said circuit when the predetermined temperature is reached to set said timing mechanism in motion, electromagnetic means for controlling said valve, and a circuit for said electromagnetic means arranged to be actuated by said timing mechanism at the end of the predetermined time interval to effect closing of the valve and thereby rendering said valve no longer responsive to the temperature conditions in said vessel.

17. Apparatus as set forth in claim 15, including a pressure responsive device associated with said vessel and adapted to maintain a predetermined pressure in said vessel during the predetermined time interval as established by the timing mechanism.

18. Apparatus as set forth in claim 15, including a second conduit arranged to introduce a fluid of different temperature than the first fluid, a valve controlling said conduit, and means controlled by said timing mechanism to open said valve at the expiration of the said predetermined time interval.

EDWIN E. CORBETT.